(12) United States Patent
Wigglesworth et al.

(10) Patent No.: US 9,683,133 B2
(45) Date of Patent: *Jun. 20, 2017

(54) FLUORINATED ORGANOSILOXANE NETWORK COMPOSITION

(71) Applicant: Xerox Corporation, Norwalk, CT (US)

(72) Inventors: Tony J. Wigglesworth, Oakville (CA); Adrien Pierre Côté, Mississauga (CA); Brynn Mary Dooley, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,430

(22) Filed: Dec. 1, 2015

(65) Prior Publication Data

US 2016/0083625 A1 Mar. 24, 2016

Related U.S. Application Data

(62) Division of application No. 14/138,802, filed on Dec. 23, 2013, now Pat. No. 9,233,539.

(51) Int. Cl.
*B41J 2/01* (2006.01)
*C09D 183/06* (2006.01)
(Continued)

(52) U.S. Cl.
CPC .............. *C09D 183/06* (2013.01); *B41J 2/01* (2013.01); *B41J 2/1433* (2013.01); *B41J 2/162* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2004/0077757 A1* 4/2004 Araki .................. C09D 171/02
524/264
2004/0125169 A1 7/2004 Nakagawa et al.
(Continued)

FOREIGN PATENT DOCUMENTS

EP 1995214 A2 11/2008

OTHER PUBLICATIONS

Office Action for U.S. Appl. No. 14/138,794, dated Feb. 26, 2015 (9 pages).
(Continued)

*Primary Examiner* — Manish S Shah
(74) *Attorney, Agent, or Firm* — Hoffman Warnick LLC

(57) ABSTRACT

The present disclosure provides an ink jet print head face plate. The ink jet print head face plate includes a face plate; and a siloxyfluorocarbon networked polymer disposed on the face plate. The siloxyfluorocarbon networked polymer is a polymerization product of a mixture including from about 2 to about 12 alkoxysilane precursor materials, wherein at least one of the alkoxysilane precursor materials is a hydrophobic alkoxysilane precursor material; and at least one of the alkoxysilane precursor materials is an aromatic alkoxysilane precursor material. The siloxyfluorocarbon networked polymer is insoluble in solvents selected from the group consisting of ketones, chlorinated solvents and ethers.

7 Claims, 4 Drawing Sheets

(51) Int. Cl.
*B41J 2/14* (2006.01)
*B41J 2/16* (2006.01)
*C09D 183/08* (2006.01)

(52) U.S. Cl.
CPC ........... *B41J 2/1606* (2013.01); *B41J 2/1634* (2013.01); *B41J 2/1645* (2013.01); *C09D 183/08* (2013.01); *B41J 2202/03* (2013.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; B41J 2/04598; B41J 2/04586; B41J 2/04581; B41J 2/14274; B41J 2/04588; B41J 2/04595; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......................... 347/95–105, 44–65
See application file for complete search history.

(56) References Cited

U.S. PATENT DOCUMENTS

| | | | |
|---|---|---|---|
| 2007/0092644 | A1 | 4/2007 | Soutar et al. |
| 2007/0243394 | A1* | 10/2007 | Yamaya ............... C09D 183/08 428/447 |
| 2011/0069117 | A1 | 3/2011 | Ohzeki et al. |
| 2012/0156481 | A1 | 6/2012 | Moorlag et al. |
| 2012/0242749 | A1* | 9/2012 | Moorlag ............... C09D 201/10 347/45 |
| 2014/0323005 | A1 | 10/2014 | Dooley et al. |

OTHER PUBLICATIONS

Final Office Action for U.S. Appl. No. 14/138,794, dated Jul. 27, 2015, 10 pages.
Restriction Requirement for U.S. Appl. No. 14/138,802, dated Apr. 7, 2015, 7 pages.
Office Action for U.S. Appl. No. 14/138,802, dated Jun. 9, 2015, 14 pages.
Notice of Allowance and Fee(s) Due for U.S. Appl. No. 14/138,802, dated Sep. 14, 2015, 7 pages.
Office Action for U.S. Appl. No. 14/138,794, dated Feb. 11, 2016, 15 pages.
Final Office Action for U.S. Appl. No. 14/138,794, dated Jul. 21, 2016, 8 pages.
Final Office Action for U.S. Appl. No. 14/955,425, dated Feb. 16, 2017, 6 pages.
Office Action for U.S. Appl. No. 14/955,425, dated Nov. 15, 2016, 25 pages.
Notice of Allowance of U.S. Appl. No. 14/955,425 dated Apr. 18, 2017, 11 pages.

* cited by examiner

FLUORINATED ORGANOSILOXANE NETWORK COMPOSITION

CROSS REFERENCE TO RELATED APPLICATIONS

This application relates to commonly assigned copending application Ser. No. 14/138,794 entitled "Organosiloxane Network Composition.", filed simultaneously herewith and incorporated by reference herein.

FIELD OF USE

The present disclosure is generally related, in various embodiments, to shapeable coatings. The disclosure relates to a formulation composition for producing a coating for a face plate of an ink jet print head.

BACKGROUND

Organosiloxane network (OSN) based materials are important for a wide-range of industrial applications including durable surface coatings, anti-wetting coatings, dielectric materials, optical waveguides, cosmetics and antifouling coatings. Their properties can be tailored for specific applications through judicious choice of building blocks in a coating formulation.

Ink-jet printing generally involves ejecting ink droplets from orifices in a print head onto some type of receiving media to form a desired image. Printers for use in such printing may use, for example, solid ink or phase change ink. Solid ink or phase change ink printers may receive ink in a solid form, sometimes referred to as solid ink sticks. The solid ink sticks may be inserted through an insertion opening of an ink loader for the printer, and may be moved by a feed mechanism and/or gravity toward a heater plate. The heater plate melts the solid ink impinging on the plate into a liquid that is delivered to a print head assembly for jetting onto a recording medium. The recording medium may be, for example, paper or a liquid layer supported by an intermediate imaging member, such as a metal drum or belt.

A print head assembly of a phase change ink printer may include one or more print heads, each having a plurality of ink jets from which drops of melted solid ink are ejected towards the recording medium. The ink jets of a print head receive the melted ink from an ink supply chamber (or manifold) in the print head which, in turn, receives ink from a source, such as a melted ink reservoir or an ink cartridge. Each ink jet includes a channel having one end connected to the ink supply manifold. The other end of the ink channel has an orifice or nozzle for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or print head assembly are moved relative to each other, the deposited drops can be precisely patterned to form particular text and graphic images on the recording medium. An example of a full width array print head is described in U.S. Patent Application Publication No. 2009/0046125, which is hereby incorporated by reference herein in its entirety. An example of an ultra-violet curable ink that can be jetted in such a print head is described in U.S. Patent Application Publication No. 2007/0123606, which is hereby incorporated by reference in its entirety.

One difficulty faced by fluid ink jet systems is wetting, drooling, or flooding of inks onto the print head face plate. This may occur as a result of ink contamination of the print head face plate. FIG. 1 illustrates a face plate 5. As shown, the face plate 10 of the print head face plate 5 is displayed with the ink nozzles 15 located along the center strip of the face plate 10. The image shown displays an example of flooding, where ink has drooled 20 out of the nozzles 15 to result in print head failure. The contaminated face plate can cause or contribute to non-firing or missing drops, undersized or otherwise wrong-sized drops, satellites, or misdirected drops on the recording medium, and thus may result in degraded print quality.

As such, there is desired a formulation composition use as a print head face plate coating that maintains high drool pressure and low ink adhesion over the life of the part.

SUMMARY

The present disclosure provides an ink jet print head face plate. The ink jet print head face plate includes a face plate; and a siloxyfluorocarbon networked polymer disposed on the face plate. The siloxyfluorocarbon networked polymer is a polymerization product of a mixture including from about 2 to about 12 alkoxysilane precursor materials, wherein at least one of the alkoxysilane precursor materials is a hydrophobic alkoxysilane precursor material; and at least one of the alkoxysilane precursor materials is an aromatic alkoxysilane precursor material. The siloxyfluorocarbon networked polymer is insoluble in solvents selected from the group consisting of ketones, chlorinated solvents and ethers.

In embodiments, the present disclosure further provides an ink jet print head face plate. The ink jet print head face plate includes a face plate and a siloxyfluorocarbon networked polymer disposed on the face plate. The siloxyfluorocarbon networked polymer is a polymerization product of a mixture including from 2 to 4 alkoxysilane precursor materials, wherein at least one of the alkoxysilane precursor materials is a hydrophobic alkoxysilane represented by;

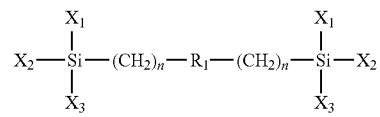

and wherein at least one the alkoxysilane precursor material is aromatic represented by;

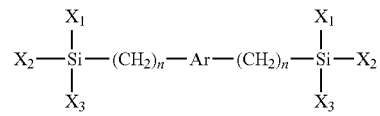

and wherein n is from 0 to 4, $X_1$, $X_2$ and $X_3$ are each a hydrocarbon group including 1 to 12 carbons atoms or an alkoxy group including 1 to 6 carbon atoms; $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group. Ar represents an aromatic or heteroaromatic group containing from 4 to 24 carbon atoms wherein the Ar group can be optionally substituted with fluorine atoms.

In embodiments, the present disclosure also provides an ink jet print head face plate having a face plate and a siloxyfluorocarbon networked polymer disposed on the face plate. The siloxyfluorocarbon networked polymer is a polymerization product of a mixture comprising from 2 to 4 alkoxysilane precursor materials, wherein at least one of the alkoxysilane precursor materials is a hydrophobic represented by the formulae;

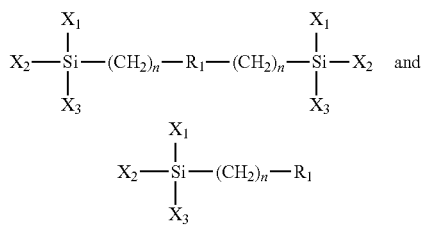

and wherein at least one the alkoxysilane precursor material is aromatic represented by the formulae;

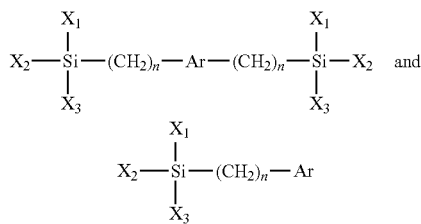

wherein n is from 0 to 4, $X_1$, $X_2$ and $X_3$ are each a hydrocarbon group including 1 to 12 carbons atoms or an alkoxy group including 1 to 6 carbon atoms; $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group. Ar represents an aromatic or heteroaromatic group containing from 4 to 24 carbon atoms wherein the Ar group can be optionally substituted with fluorine atoms.

Figure 1:
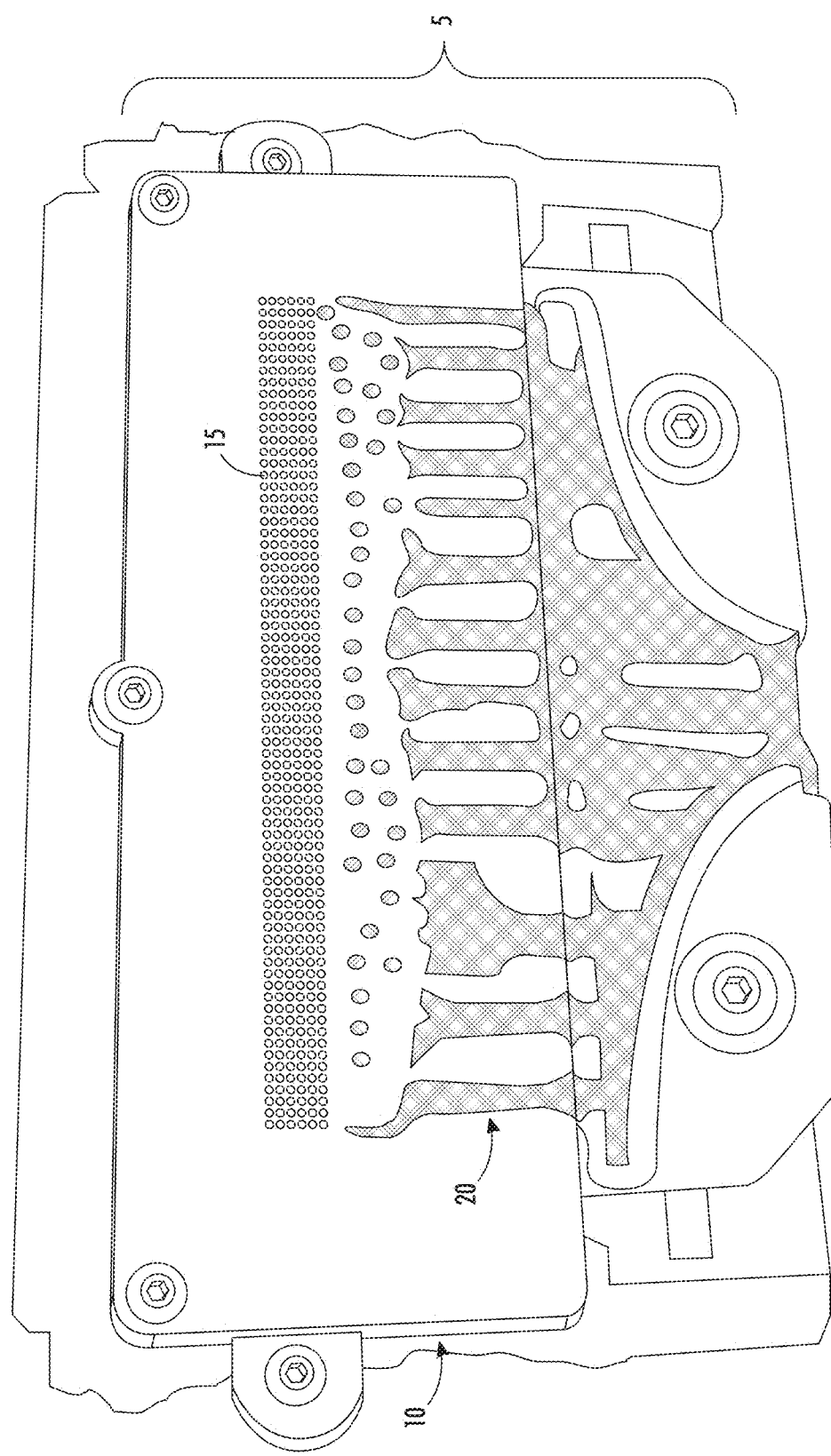
FIG. 1 is an illustration of a face plate exhibiting drooling.

It should be noted that some details of the figures have been simplified and are drawn to facilitate understanding of the embodiments rather than to maintain strict structural accuracy, detail, and scale.

DESCRIPTION OF THE EMBODIMENTS

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

In embodiments, the instant disclosure provides a formulation composition (also referred to as a "composition" or "formulation" interchangeably) that can be cleanly patterned and shaped using laser ablation. The composition may be cured to prepare a crosslinked fluorinated organosiloxane network (fOSN) also referred to as a siloxyfluorocarbon networked polymer. The coatings may be cured on a surface of an ink jet printhead (such as a face plate) forming a siloxyfluorocarbon networked polymer layer on the printhead. The coatings produced according to the present disclosure are thermally stable, have anti-wetting and non-stick interactions with inks, such as solid ink or UV curable ink, which allows the inks to easily wick from the surface, even after prolonged exposure times. The coatings are also resistant to surface wear or damage.

For specific applications such as antiwetting printhead front face plate coatings a thin-film composition that can be cleanly patterned or shaped using laser ablation is required. This is needed so that clean apertures can be laser drilled into the coating for each individual nozzle in a print head. This task is non-trivial as the material must drill cleanly with no observable cracking, flaking or delamination.

In general, fluorinated organosiloxane networks are highly crosslinked materials containing organic segments bound together via siloxane linkages. These materials exhibit high thermal robustness and high mechanical strength. The surface and mechanical properties of a fluorinated organosiloxane network can be tailored for particular applications by selecting suitable building blocks and coating formulations. That is to say, the fluorinated organosiloxane networks according to the instant disclosure are tunable materials whose properties can be varied through the selection of the type and amount of particular precursors used to produce the fluorinated organosiloxane networks. The tunability of fluorinated organosiloxane networks makes them an attractive materials platform for anti-wetting coatings in general, such as anti-wetting coatings for inkjet face plates.

In embodiments, the formulation composition according to the instant disclosure may be applied to a surface of an inkjet print head, such as an inkjet print head front plate, as a stable wet layer. In embodiments, the formulation composition may be cured to form a siloxyfluorocarbon networked polymer on the surface of the inkjet print head, such as a siloxyfluorocarbon networked polymer on the front plate of the inkjet print head. The coatings produced by the methods of the instant disclosure are thermally robust and exhibit good solid ink antiwetting characteristics. In addition, the coating produced according to the instant disclosure exhibits no chemical interaction with the ink. That is to say, the siloxyfluorocarbon networked polymers or crosslinked siloxane coatings prepared according to the instant disclosure exhibit very low adhesion with inks, such as UV ink and solid ink, as measured by an ink wicking test so that ink drops on the print head face plate are removed and leave no residue. In embodiments, a droplet of ink forms a sliding angle with the coating of the instant disclosure that is less than about 30°, such as less than about 25°, or less than about 20°, or less than about 15°. For example, in embodiments, the sliding angle may be from about 1° to about 30°, such as from about 1° to about 20°. The siloxyfluorocarbon networked polymer produced according to the instant disclosure thereby enable production of high quality, high throughput printed images with inks, such as ultra-violet curable ink or solid ink, that are ejected from a print head, wherein the images are free from print defects due to misdirected droplets or missing jets caused by face plate drooling of the ink experienced with previous print head face plate coatings.

The formulation compositions according to the instant disclosure may be applied to a variety of substrates, including stainless steel and polyimide, using a variety of solution-based processing methods (spray, dip, blade coatings), yielding a suitable thickness predetermined by the user. The formulation compositions may be selected to produce a siloxyfluorocarbon networked polymer or fluorinated organosiloxane network having strong adhesion to a given substrate (i.e., face plate surface, such as stainless steel or polyimide) without the need for surface modification or the use of promoters, allowing for a primer-free application.

In embodiments, jetted drops of ultra-violet curable ink or jetted drops of solid ink can exhibit a contact angle with the crosslinked siloxane composition prepared according to the instant disclosure that is greater than about 40°, such as from about 140° to about 40°, or from about 110° to about 45°, or from about 100° to about 50°. When ink is filled into the print head, it is desirable to maintain the ink within the print head nozzle until it is time to eject the ink. Generally, the greater the ink contact angle, the better (or higher) the holding (or drooling) pressure. The high contact angle of the crosslinked siloxane composition according to the instant disclosure (such as when used as an ink jet print head coating) can improve de-wetting and jetted ink quality, as well as eliminate weeping. As used herein, the term "holding pressure" refers to the a measurement of the ability of an aperture nozzle plate to avoid ink wetting out of the nozzle opening when the pressure of the ink tank (reservoir) increases. The composition according to the instant disclosure can provide an improved holding pressure and/or reduced (or eliminated) weeping of ink out of the nozzle.

Figure 2:
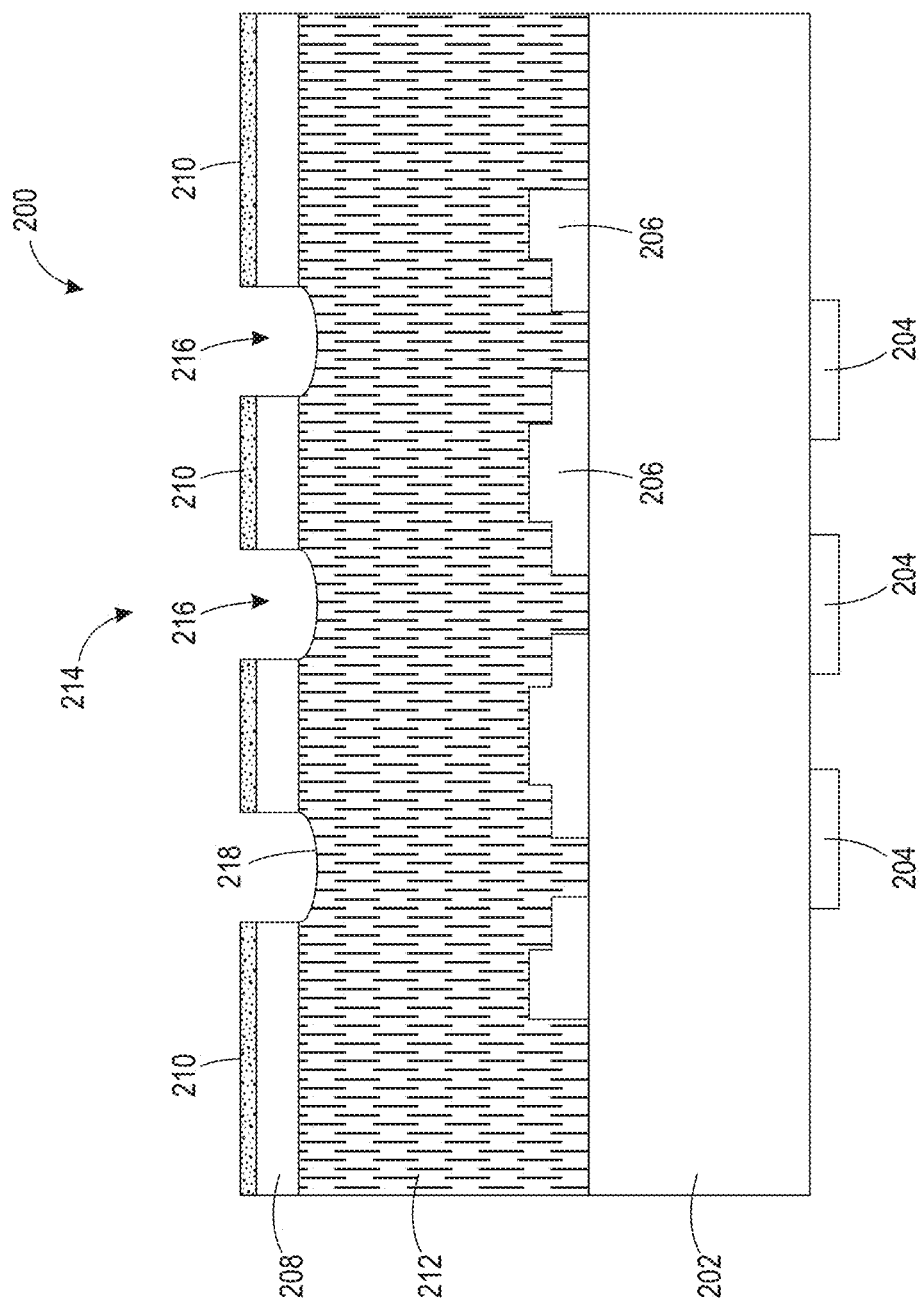
FIG. 2 is an illustration of a print head having a coating according to the instant disclosure.

In embodiments, the present disclosure provides a formulation composition for producing a crosslinked siloxane coating or siloxyfluorocarbon networked polymer, which may be used as a print head face plate coating. The coatings of the present disclosure may be used with any type of print head. FIG. 2 illustrates a print head 200 having a coating 210 prepared according to the instant disclosure disposed thereon. The print head 200 includes a base substrate 202 with transducers 204 on one surface and acoustic lenses 206 on an opposite surface. Spaced from the base substrate 202 is a liquid level control plate 208. A coating 210 or siloxyfluorocarbon networked polymer in accordance with the present disclosure is disposed along plate 208. In embodiments, the coating may have a thickness ranging from about 100 nm to about 20 µm, such as ranging from about 500 nm to about 10 µm, or ranging from about 1 µm to about 5 µm.

The base substrate 202 and the liquid level control plate 208 define a channel, which holds a flowing liquid 212. The liquid level control plate 208 contains an array 214 of apertures 216. The transducers 204, acoustic lenses 206, and apertures 216 are all axially aligned such that an acoustic wave produced by a single transducer 204 will be focused by its aligned acoustics 206 at approximately a free surface 218 of the liquid 212 in its aligned aperture 216. When sufficient power is obtained a droplet is emitted from surface 218.

The coating 210 or siloxyfluorocarbon networked polymer produced in accordance with the present disclosure may be disposed on the print head face plate along plate 208 and may provide the print head face plate with sliding angle characteristics to prevent ink from accumulating near the nozzles and interfering with the jetting of the ink droplets. In embodiments, the coating 210 may provide the print head face plate with sliding angle characteristics such that satellite droplets of ink, such as UV curable ink and solid ink, landing on the nozzle plate exhibit a low sliding angle.

In embodiments, a droplet of ink forms a sliding angle with the coating of the instant disclosure that is less than about 30°, such as less than about 25°, or less than about 20°, or less than about 15°. For example, in embodiments, the sliding angle may be from about 1° to about 30°, such as from about 1° to about 20°.

Formulation Composition

The formulation composition disclosed herein is a polymerization product of a mixture including from about 2 to about 12 alkoxysilane precursor materials, such as from about 2 to about 10 alkoxysilane precursor materials, or from about 2 to about 8 alkoxysilane precursor materials. In embodiments, at least one of the alkoxysilane materials is a hydrophobic alkoxysilane precursor material and at least one of the alkoxysilane precursor materials is an aromatic alkoxysilane precursor material.

In embodiments, the crosslinked siloxane composition or siloxyfluorocarbon networked polymer includes a mole ratio of hydrophobic alkoxysilane precursor materials to aromatic alkoxysilane precursor materials of from about 1:9 to about 9:1. The aromatic alkoxysilane precursor material imparts a light absorption property to the material. The aromatic alkoxysilane precursor material attenuates the laser ablation of the material.

The term hydrophobic (superhydrophobic) refers, for example, to the property of repelling water, or other polar species, such as methanol. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

In embodiments, the hydrophobic precursors may independently vary in their number of alkoxy substitutions. For example, in embodiments, the hydrophobic alkoxysilane precursor materials may be independently selected from monofunctional, difunctional, or trifunctional alkoxysilanes. For example, in embodiments, the hydrophobic alkoxysilane precursor materials may be monofunctional alkoxysilanes, such as trimethylmethoxysilane; difunctional alkoxysilanes such as dimethyldimethoxysilane, diphenyldimethoxysilane or methylphenyl-dimethoxysilane; or trifunctional alkoxysilanes such as methyltrimethoxysilane, methyltriethoxysilane, ethyltrimethoxysilane, methyltrimethoxyethoxysilane, vinyltrimethoxysilane, vinyltriethoxysilane, phenyltrimethoxysilane, γ-glycidoxy-propylmethyldiethoxysilane, γ-glycidoxypropyltrimethoxysilane, γ-glycidoxy-propyltriethoxysilane, γ-aminopropyltriethoxysilane, γ-aminopropyltrimethoxysilane, γ-aminopropylmethyldimethoxysilane, N-β-(aminoethyl)-γ-aminopropyltriethoxy-silane, (tridecafluoro-1,1,2,2-tetrahydrooctyl)triethoxysilane, (3,3,3-trifluoropropyl)-trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane.

In embodiments, the hydrophobic alkoxysilane precursor material may be a linear or a branched hydrocarbon. In embodiments, the hydrophobic alkoxysilane precursors may include siloxyfluorocarbon (SFC) precursors. SFC precursors are designed to incorporate fluorinated chains that add flexibility and low-surface energy character to the resulting material. A variety of SFC precursors with varying siloxane and fluorocarbon components may be used to prepare OSN coatings, including di- and tri-alkoxy silanes, linear and branched fluoroalkanes, and fluoroarenes.

In embodiments, the hydrophobic alkoxysilane precursor material may be represented by the structure:

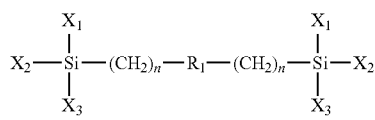

wherein n is from about 0 to about 4, $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms.

In addition to the monomers listed above, the hydrophobic alkoxysilane precursor may be represented by the structure:

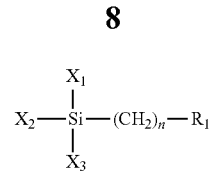

Where n, $R_1$, $X_1$, $X_2$, and $X_3$ are as defined above.

In embodiments, the aromatic alkoxysilane precursor material may be represented by the structure:

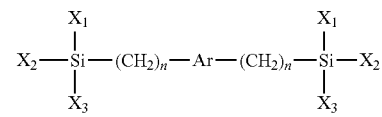

wherein n is from about 1 to about 4, where $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. Ar represents an aromatic or heteroaromatic group containing from 4 to 24 carbon atoms. The Ar group can be optionally substituted with fluorine atoms. In embodiments, Ar groups include phenyl, biphenyl, naphthyl, anthracenyl, binaphthyl, 4-nitrophenyl, 4-fluorophenyl and the like.

In addition to the monomers listed above, the aromatic alkoxysilane precursor may be represented by the structure:

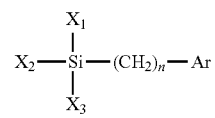

where n is from about 0 to about 4, $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. Ar represents an aromatic or heteroaromatic group containing from 4 to 24 carbon atoms. The Ar group can be optionally substituted with fluorine atoms. In embodiments, Ar groups include phenyl, biphenyl, naphthyl, anthracenyl, binaphthyl, 4-nitrophenyl, 4-fluorophenyl and the like.

In addition to the monomers listed above, the siloxyfluorocarbon networked polymer may be prepared using monomers selected from the group consisting of silicon tetraalkoxide and branched pentasilanes. The silicon tetraalkoxide is represented by the respective structure:

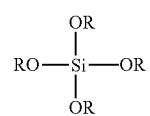

The branched pentasilanes are represented by the respective structure:

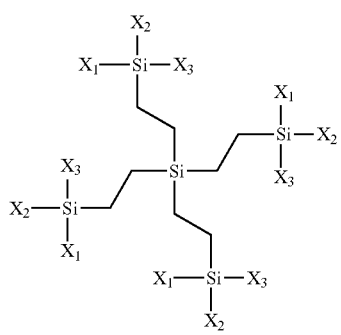

where $X_1$, $X_2$, and $X_3$ are as defined above.

The monomers may be networked together so that all monomers are molecularly bonded together in the cured coating via silicon oxide (Si—O—Si) linkages. Therefore, in embodiments, a molecular weight cannot be given for the siloxyfluorocarbon networked polymer because the coating may be crosslinked into one system.

In embodiments, the alkoxysilane precursors are processed via sol-gel processing (discussed below). In embodiments, the mole ratio of the hydrophobic alkoxysilane precursors to the aromatic alkoxysilane precursor materials may be from about 1:9 to about 9:1, such as from about 1:7 to about 7:1, or from about 3:5 to about 5:3, or about 1:1.

The final OSN can then be shaped using a laser ablation technique wherein the incident irradiation wavelength is at or near the absorption maximum of the aromatic chromophore. In embodiments the irradiation wavelength is within 20 nm of the absorption maximum of the aryl chromophore. The final shape of the material is application dependent. Some representative shapes or patterns include but are not limited to individual holes or apertures, nanopillars, nanocones, regular hexagonal patterns, lines or channels, surface relief gratings, and 3D objects including letters or symbols.

The aromatic group of the aromatic alkoxysilane precursor material is tailored to absorb radiation at a predetermined wavelength. This allows one to ablate material from the composition using a laser at the predetermined wavelength.

As discussed above, in embodiments, the instant disclosure provides a formulation composition to produce a organosiloxane (OSN) network composition, also referred to as a siloxyfluorocarbon networked polymer. In embodiments, the formulation composition may comprise a sol prepared from a mixture of monomers comprising at least one alkoxysilane monomer; a solvent; a catalyst; and water. In embodiments, stable formulations may be produced by balancing the amount of monomer with the amount of catalyst, and by using a suitable amount of alcohol-based solvent. In embodiments, the formulation compositions may be applied to a substrate while in the sol phase, and gelation may occur upon standing or with heat treatment.

Sol-Gel Polymerization

Siloxyfluorocarbon monomers may be crosslinked via solution-gelation (or "sol-gel") chemistry, where hydrolysis and condensation of alkoxide or hydroxide groups occurs and upon curing at elevated temperatures, produces a crosslinked siloxane coating that may be used as a coating, such as for print head face plates. The crosslinked fluorinated siloxane coating prepared according to the instant disclosure can withstand high temperature conditions without melting or degradation, is mechanically robust under such conditions, and displays good release under such conditions.

A general process for forming sol-gels is discussed, for example, in C. J. Brinker & G. Scherer, Sol-Gel Science: The Physics and Chemistry of Sol-Gel Processing (Academic Press, Boston, 1990), and U.S. Patent Application Publication No. 2007/0082207, the disclosures of which are incorporated herein by reference in their entireties. This two-step reaction process, which transforms a miscible one-phase liquid solution into a two-phase material, is called "sol-gel transition." Generally, an alkoxysilane/solvent/water mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network or entrapped in the polymer structure.

The sol-gel polymerization processes according to the instant disclosure may be carried out at any suitable temperature, such as from about 25° C. to about 200° C., or from about 40° C. to about 150° C., or from about 65° C. to about 100° C.

The monomers are networked together so that all monomers are bonded together in the cured coating via silicon oxide (Si—O—Si) linkages. Therefore, a molecular weight cannot be given for the siloxyfluorocarbon networked polymer because the coating is crosslinked into one system.

In embodiments, one can use metal alkoxide (M=Si, Al, Ti, and so forth) functionalities as cross-linking components between fluorocarbon chains. For cross-linking to occur efficiently throughout the composite, bifunctional fluorocarbon chains are used. Mono-functional fluorocarbon chains can also be added to enrich fluorination content. $CF_3$-terminated chains align at the fusing surface to reduce surface energy and improve release.

Solvents used for sol-gel processing of siloxycarbon precursors and coating of layers include organic hydrocarbon solvents, and fluorinated solvents. Alcohols such as methanol, ethanol, and isopropanol are used to promote sol-gel reactions in solution. Further examples of solvents include ketones such as methyl ethyl ketone, and methyl isobutyl ketone. Mixtures of solvents may be used. In embodiments, the solvent may be an alcohol solvent. In embodiments, the alcohol solvent may be present in an amount of at least 20 weight percent of the formulation composition, such as from about 20 weight percent to about 70 weight percent, or from about 30 weight percent to about 50 weight percent of the formulation composition.

In embodiments, the solvent system may include the addition of a portion of water, such as from about 1 molar equivalent to 10 molar equivalents of water compared to siloxyfluorocarbon precursors or the siloxane terminated fluorocarbons, or from about 2 molar equivalents to about 6 molar equivalents of water.

Upon the addition of water to the solution of sol gel precursors, alkoxy groups react with water, and condense to form agglomerates that are partially networked, and are referred to as a sol. The sol may form a gel upon standing or upon drying.

In embodiments, the viscosity of the sol may be from about 1 centipoises (cPs) to about 10 cPs, such as from about 2 to about 9 cPs, or from about 3 to about 8 cPs, when the sol is prepared. In embodiments, the viscosity of the sol when the sol is applied to a substrate In embodiments, the sol may be applied to a substrate. Following coating of the sol onto a substrate, a gel may be formed upon standing or from drying with heat treatment, forming a fully networked siloxane coating on the substrate.

In embodiments, the crosslinked siloxane composition does not dissolve when exposed to solvents (such as ketones, chlorinated solvents, ethers etc.), does not degrade at temperatures up to 350° C., and is stable at higher temperatures, depending on the system.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 100 nm to about 20 µm, such as from about 500 nm to about 10 µm, or from about 1 µm to about 5 µm.

In some embodiments, a coating technique that may be used is meniscus coating of steel surfaced jetstacks while applying positive pressure to the apertures to prevent their occlusion during coating. When making polyimide aperture plates, the jet openings are formed by laser ablation after coating. The coating can include laser absorptive materials to aid the ablation process.

As discussed above, stable formulation compositions may be produced by balancing the amount of monomer to the amount of catalyst, and by using a sufficient amount of solvent, such as alcohol-based solvent. In embodiments, a solution of monomers in ethanol or another alcohol, such as methanol or isopropanol, or a mixture containing alcohol, where the solvent is present in an amount of at least 20 weight percent of the formulation composition. The formulation composition may be prepared by adding water from about 1 molar equivalent to about 10 molar equivalents of water compared to siloxyfluorocarbon precursors or the siloxane terminated fluorocarbons, or from about 2 molar equivalents to about 6 molar equivalents of water, with a catalytic amount of acid or base to initiate networking. In embodiments, the catalyst is a hydroxide ion catalyst present in an amount of from about 0.1 mol % to about 5 mol % hydroxide ion per silicon atom, such as from about 0.2 mol % to about 3 mol %, or from about 0.3 mol % to about 1 mol %.

In embodiments, solids loading of from about 20 weight percent to about 80 weight percent, such as from about 30 weight percent to about 70 weight percent, or from about 40 weight percent to about 60 weight percent, may be employed.

In embodiments, the sol thus produced may be filtered prior to coating. In embodiments, the sol may also be subjected to a pre-curing step following filtration, such as by heating at a temperature of from about 40° C. to about 60° C., such as from about 45° C. to about 55° C., for from about 10 to about 45 minutes, such as from about 20 to about 40 minutes, or from about 25 to about 35 minutes. In embodiments, pre-curing may take place before the sol is coated onto a substrate. In embodiments, pre-curing may take place after the sol is coated onto a substrate.

In embodiments, the formulation composition may be coated on a surface of an inkjet print head, such as a print head face plate. The formulation may be cured to yield a crosslinked siloxane layer on the surface of the inkjet print head. In such embodiments, the crosslinked siloxane layer has an increased adherence to the face plate (such as a metal or polymer face plate) and increased wear resistance as compared to a face plate coating without the crosslinked siloxane composition. In embodiments, the topcoat layer also exhibits little or no adhesion with solid or ultraviolet curable inks at a temperature of from about 40 to about 180° C. as compared to a topcoat layer without crosslinked siloxane composition.

In embodiments, an inkjet print head with a front face having a crosslinked siloxane coating prepared according to the methods of the instant disclosure may be used in printing an image to a substrate. For example, in embodiments, the inkjet print head prepared according to the instant disclosure may be used to apply an inkjet ink to a substrate. In embodiments, the face plate of the inkjet print head has excellent wear resistance, such that the inkjet print coating surface maintains a low sliding angle even after 200 cleaning cycles with a Crock cloth, wherein the low sliding angle is from about 1° to less than about 50°, or from about 1° to less than about 30°.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

As representative examples several fluorinated organosiloxane networks (fOSN) were prepared as thin-films (1-2 µm thick) on Upilex polyimide or quartz substrates using a series of different fluorinated and aryl dialkoxy silane building blocks as described in the Examples below. The formulations were prepared in n-butanol (at about 30 weight percent to about 70 weight percent solids loading) using tetrabutylammonium hydroxide base as catalyst (From about 0.5 mole percent to about 1 mole percent) and activated with water (1 molar equiv.). After thorough mixing, the formulations were filtered through a 0.45 µm PTFE syringe filter and deposited using either spin-coating or draw-down coating techniques. After curing at about 155° C. for about 40 minutes the films were evaluated by UV-Vis spectroscopy and individual apertures were laser drilled into the films by laser ablation using a 248 nm laser. The materials used were designed and optimized for applications as an antiwetting coating for an HD piezo inkjet print-head front face plate and is not meant to limiting. The results are presented in the Examples below.

Comparative Example 1. Baseline Laser Drilling Performance of fOSN

A fOSN coating was prepared from fluorinated building block Structure 1a below to establish the baseline laser drilling performance at 248 nm. This material has no chromophore added and does not absorb at 248 nm. As a result the laser drilling performance is poor and complete apertures could be fabricated using this composition.

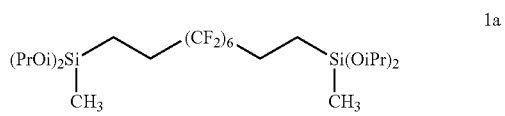

1a

Comparative Example 2

A fOSN coating was prepared from the fluorinated building blocks Structure 1a, Structure 2a and Structure 3a to establish a low surface energy material which has good antiwetting properties and improved laser drilling performance at 248 nm. This material has a chromophore that absorbs weakly at 248 nm The absorbance of the aryl chromophore of represented by Structure 3a is at its peak an a wavelength of about 202 nm. The absorbance of the aryl chromophore of represented by Structure 3a at 248 nm is about 0.1 A.U. As a result the laser drilling performance is poor and complete apertures could not be fabricated using this composition.

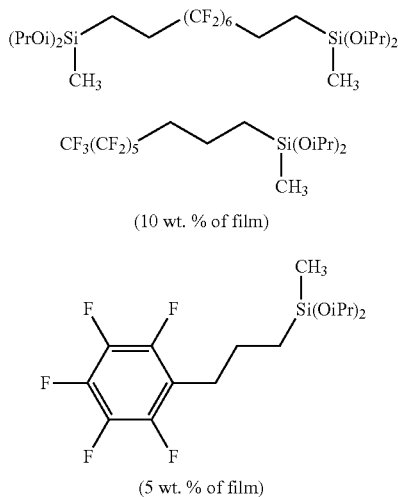

Example 3

A fOSN was prepared from the fluorinated building blocks as shown below in Structures 1a, 2b and 3c. The resulting material possessed a low surface energy which translates into excellent antiwetting properties. This material has the correct chromophore and absorbs strongly at 248 nm as shown in FIG. 1). The laser drilling performance at 248 nm is shown in FIG. 2. As a result the laser drilling performance is improved and complete apertures could be fabricated using this composition.

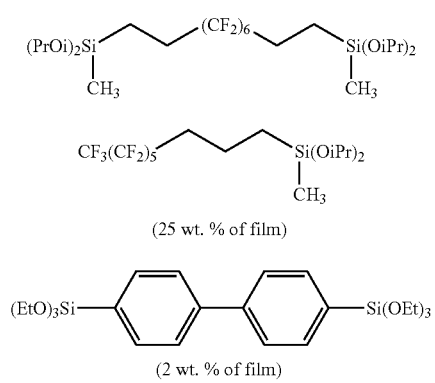

Example 4

Figure 3:
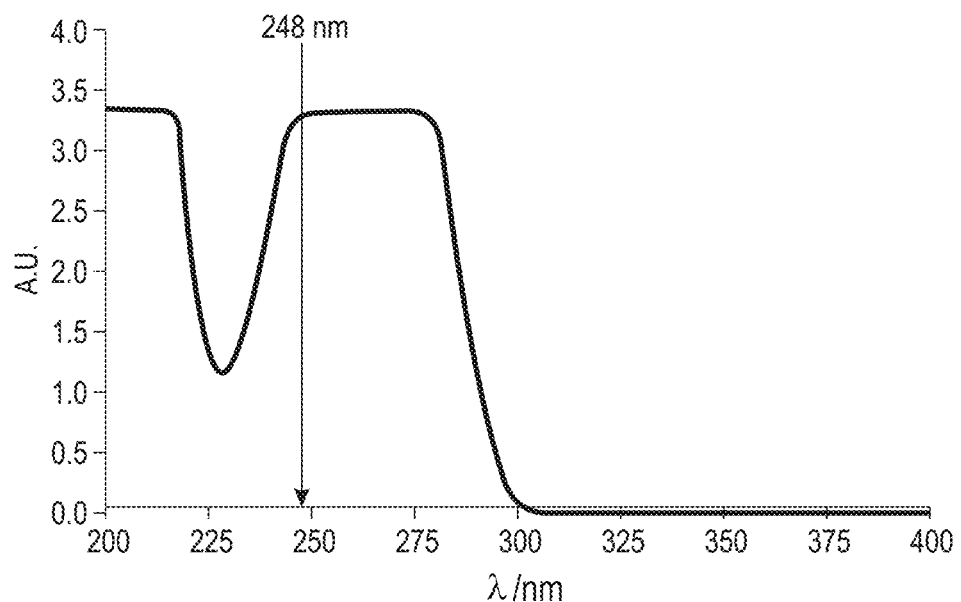
FIG. 3 is an absorbance spectrum of the chromophore used in Example 3.
Figure 4:
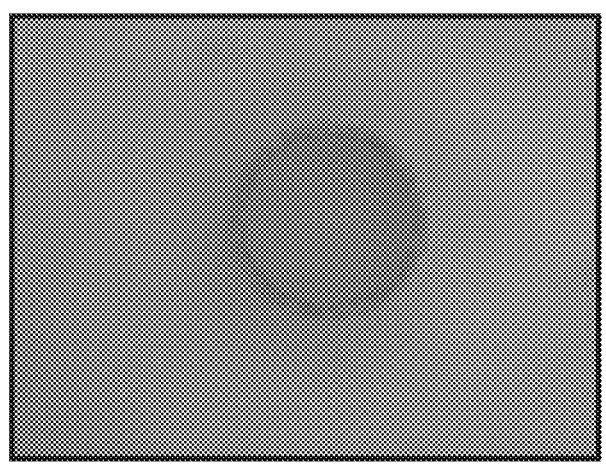
FIG. 4 is an optical micrograph of a laser ablated aperture of the formulation used in Example 3
Figure 5:
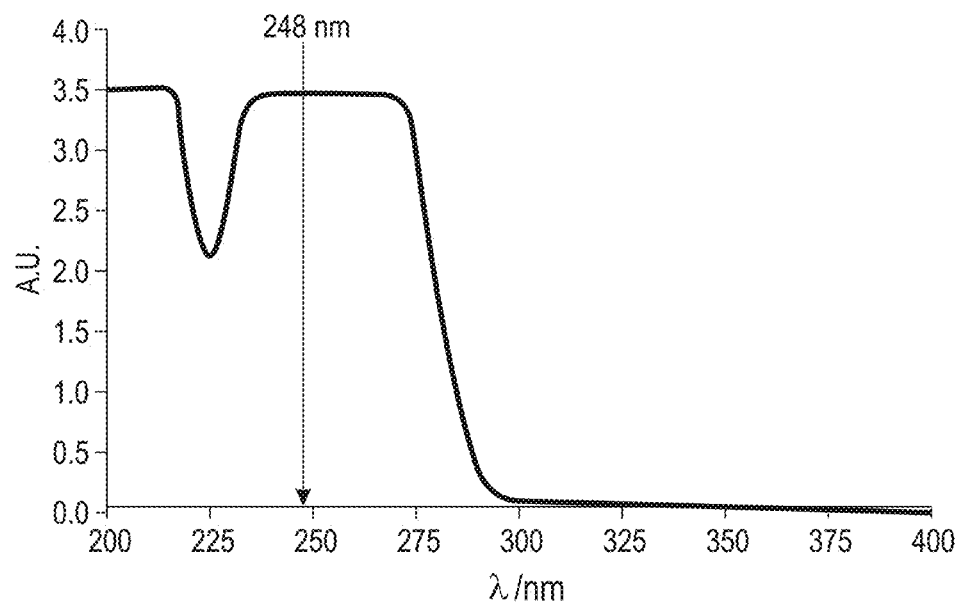
FIG. 5 is an absorbance spectrum of the chromophore used in Example 4.
Figure 6:
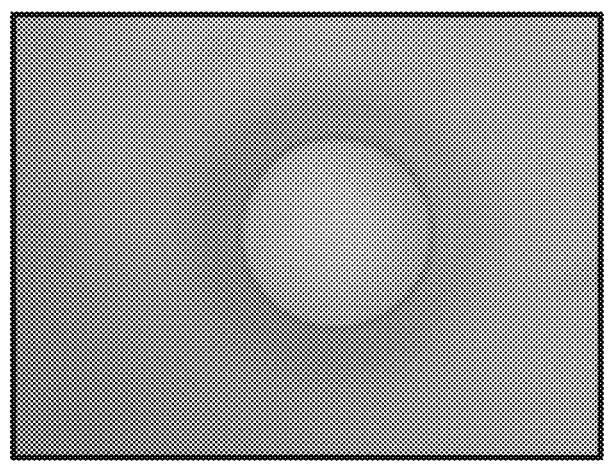
FIG. 6 is an optical micrograph of a laser ablated aperture of the formulation used in Example 4.

A fOSN was prepared from the fluorinated building blocks as shown below in Structures 1a, 2b and 3c. The resulting material possessed a low surface energy which translates into excellent antiwetting properties. This material has the correct chromophore and absorbs strongly at 248 nm as shown in the UV-spectrum of FIG. 3. The laser drilling performance at 248 nm is shown in FIG. 4. As a result the laser drilling performance is improved and complete apertures could be fabricated using this composition. In FIG. 4 no cracking or delamination is observed around aperture edges. In this formulation all silane building blocks have similar reactivity leading to a homogeneous distribution of the chromophore in the coating with excellent laser drilling performance.

Example 4 exhibited excellent antiwetting performance with Lance solid ink (Table 1) over a range of coatings with different fluorine content and chromophore concentrations. In all cases the contact angle was above 55° and the sliding angle was less than 20°. This demonstrates that this composition has a reasonable formulation latitude which will be important for optimizing the coating during pilot coating/manufacturing trials.

TABLE 1

Antiwetting performance of fOSN containing a biphenyl chromophore

| Entry | 1a (wt. %) | 2a (wt. %) | 3c (wt. %) | Contact angle (°) | Sliding Angle (°) |
|---|---|---|---|---|---|
| 1 | 85 | 10 | 5 | 60-61 | 2.9-4.5 |
| 2 | 68 | 30 | 2 | 58-59 | 3.8-4.9 |
| 3 | 65 | 30 | 5 | 58-60 | 3.9-6.9 |
| 4 | 61 | 30 | 9 | 55-58 | 1.6-3.6 |

Disclosed herein is a shapeable fOSN composition with covalently bound chromophores that can be cleanly "shaped or patterned" using a laser ablation technique. The key features enabling this invention are the incorporation of a covalently bound chromophore that is statistically and uniformly distributed in the network and has a high absorption coefficient at the patterning wavelength.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. An ink jet print head face plate comprising:
a face plate; and
a siloxyfluorocarbon networked polymer disposed on the face plate wherein the siloxyfluorocarbon networked polymer is a polymerization product of a mixture comprising from 2 to 4 alkoxysilane precursor materials, wherein at least one of the alkoxysilane precursor materials is a hydrophobic alkoxysilane precursor material represented by the formulae;

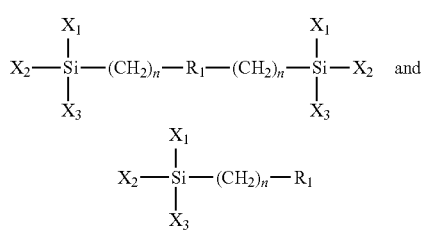

and wherein at least one the alkoxysilane precursor material is aromatic alkoxysilane precursor material represented by the formulae;

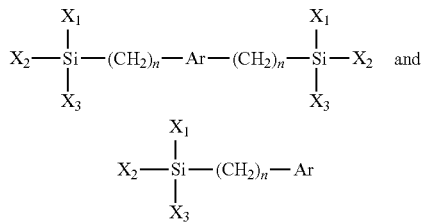

wherein n is from 0 to 4, $X_1$, $X_2$ and $X_3$ are each a hydrocarbon group including 1 to 12 carbons atoms or an alkoxy group including 1 to 6 carbon atoms; $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group, and Ar represents an aromatic or heteroaromatic group containing from 4 to 24 carbon atoms wherein the Ar group can be optionally substituted with fluorine atoms, wherein a mole ratio of hydrophobic alkoxysilane precursor materials to aromatic alkoxysilane precursor materials is from about 1:9 to about 9:1.

2. The ink jet print head face plate according to claim 1, wherein jetted drops of a UV curable ink or jetted drops of a solid ink on the siloxyfluorcarbon networked polymer exhibit a contact angle of from about 140° to about 40°.

3. The ink jet print head face plate according to claim 1, wherein the siloxyfluorcarbon networked polymer has a sliding angle that is less than about 30°.

4. The ink jet print head face plate according to claim 1, wherein aromatic alkoxysilane precursor material absorbs light at a 248 nm wavelength.

5. The ink jet print head face plate according to claim 1, wherein the alkoxysilane precursor materials are bonded together via silicon oxide (Si—O—Si) linkages in a single system and wherein the single system is insoluble in solvents selected from the group consisting of ketones, chlorinated solvents and ethers.

6. The ink jet print head face plate according to claim 1, wherein the hydrophobic alkoxysilane precursor material and the aromatic alkoxysilane precursor material are homogenously distributed in the siloxyfluorocarbon networked polymer.

7. The ink jet print head face plate according to claim 1, wherein aromatic alkoxysilane precursor material absorbs light at a predetermined wavelength.

* * * * *